US010972299B2

(12) United States Patent
Wiener et al.

(10) Patent No.: US 10,972,299 B2
(45) Date of Patent: Apr. 6, 2021

(54) ORGANIZING AND AGGREGATING MEETINGS INTO THREADED REPRESENTATIONS

(71) Applicant: Cisco Technology, Inc., San Jose, CA (US)

(72) Inventors: David Abraham Wiener, Redwood City, CA (US); Stuart Elliot Posluns, Atherton, CA (US); Mohamed Gamal Mohamed Mahmoud, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 251 days.

(21) Appl. No.: 16/122,728

(22) Filed: Sep. 5, 2018

(65) Prior Publication Data

US 2019/0074987 A1 Mar. 7, 2019

Related U.S. Application Data

(60) Provisional application No. 62/555,000, filed on Sep. 6, 2017.

(51) Int. Cl.
*G06F 16/00* (2019.01)
*H04L 12/18* (2006.01)
(Continued)

(52) U.S. Cl.
CPC ........ *H04L 12/1831* (2013.01); *G06F 16/248* (2019.01); *G06F 16/24578* (2019.01); *G06F 16/345* (2019.01); *G06F 16/685* (2019.01); *G06F 16/90348* (2019.01); *G06F 16/9535* (2019.01); *G06Q 10/10* (2013.01);
(Continued)

(58) Field of Classification Search
CPC .. G06F 16/90348; G06F 16/58; G06F 16/583; G06F 16/683; G06F 16/93; G06F 16/48; G06F 11/3082; G06F 11/3438; G06F 40/44; G06F 16/685; G06F 16/24578; G06F 16/345; G06F 16/24579; G06F 16/40; G06F 16/9535; G06F 16/24575; G06F 16/248; H04W 4/21; H04W 4/08; G06Q 10/109; G06Q 10/1095; G06Q 10/063;
(Continued)

(56) References Cited

U.S. PATENT DOCUMENTS 9,641,563 B1 * 5/2017 Kitada .................... G10L 25/63
9,773,231 B2 * 9/2017 Libin .................. G06Q 10/1095
(Continued)

FOREIGN PATENT DOCUMENTS

| WO | WO2009155375 | * 12/2009 |
| WO | WO2012158177 | * 11/2012 |
| WO | WO2016004584 | * 1/2016 |

*Primary Examiner* — Srirama Channavajjala
(74) *Attorney, Agent, or Firm* — Merchant & Gould P.C.

(57) ABSTRACT

One embodiment of the present invention sets forth a technique for organizing meeting content. The technique includes generating, from a set of available meetings, a thread comprising a collection of related meetings that share one or more attributes. The technique also includes aggregating data for the related meetings, where the data comprises metadata for the related meetings and terms included in recordings of the related meetings. The technique further includes outputting at least a portion of the aggregated data within a summary of the thread.

18 Claims, 6 Drawing Sheets

(51) Int. Cl.
*G06F 16/683* (2019.01)
*G06F 16/2457* (2019.01)
*G06F 16/903* (2019.01)
*G06Q 10/10* (2012.01)
*G06F 16/9535* (2019.01)
*G06F 16/248* (2019.01)
*G06F 16/34* (2019.01)

(52) U.S. Cl.
CPC ....... *G06Q 10/109* (2013.01); *G06Q 10/1095* (2013.01); *H04L 12/1822* (2013.01)

(58) Field of Classification Search
CPC .... G06Q 10/0631; G06Q 10/06; G06Q 50/01; G06Q 10/10; H04L 12/1822; H04L 12/1831
See application file for complete search history.

(56) References Cited

U.S. PATENT DOCUMENTS

| | | | | |
|---|---|---|---|---|
| 2003/0154212 A1* | 8/2003 | Schirmer | ............. | G06Q 10/107 |
| 2003/0220973 A1* | 11/2003 | Zhu | .................... | H04L 12/1831 |
| | | | | 709/205 |
| 2004/0141005 A1* | 7/2004 | Banatwala | .......... | H04L 12/1813 |
| | | | | 715/751 |
| 2009/0177745 A1* | 7/2009 | Davis | .................... | G06Q 30/02 |
| | | | | 709/204 |
| 2010/0115003 A1* | 5/2010 | Soules | .................. | G06F 16/904 |
| | | | | 707/822 |
| 2011/0022967 A1* | 1/2011 | Vijayakumar | ....... | G06Q 10/107 |
| | | | | 715/753 |
| 2011/0040588 A1* | 2/2011 | Durocher | ........... | G06Q 30/0206 |
| | | | | 705/7.35 |
| 2011/0066611 A1* | 3/2011 | Groeneveld | ........ | G06F 16/9535 |
| | | | | 707/723 |
| 2011/0185288 A1* | 7/2011 | Gupta | ................. | H04L 65/4053 |
| | | | | 715/752 |
| 2011/0293250 A1* | 12/2011 | Deever | .................. | H04N 5/275 |
| | | | | 386/290 |
| 2012/0290666 A1* | 11/2012 | Fabre | .................. | G06Q 10/107 |
| | | | | 709/206 |
| 2013/0113804 A1* | 5/2013 | Ferman | ................ | G06T 11/206 |
| | | | | 345/440 |
| 2013/0226758 A1* | 8/2013 | Reitan | .................... | G06Q 30/02 |
| | | | | 705/35 |
| 2013/0273976 A1* | 10/2013 | Rao | ..................... | H04L 12/1822 |
| | | | | 455/563 |
| 2015/0106362 A1* | 4/2015 | Dassa | ..................... | G06F 16/40 |
| | | | | 707/723 |
| 2016/0117624 A1* | 4/2016 | Flores | .................. | H04L 67/306 |
| | | | | 705/7.39 |
| 2016/0188662 A1* | 6/2016 | Xie | ....................... | G06F 16/243 |
| | | | | 707/771 |
| 2016/0283585 A1* | 9/2016 | Zheng | ................... | G06F 16/345 |
| 2017/0063749 A1* | 3/2017 | Gupta | .................... | H04L 51/16 |
| 2019/0074987 A1* | 3/2019 | Wiener | ............ | G06F 16/90348 |

* cited by examiner

ORGANIZING AND AGGREGATING MEETINGS INTO THREADED REPRESENTATIONS

CROSS REFERENCE TO RELATED APPLICATION

This application claims priority benefit of the U.S. Provisional Patent Application titled, "Multi-Threaded Meeting Representation," filed on Sep. 6, 2017 and having Ser. No. 62/555,000. The subject matter of this related application is hereby incorporated herein by reference.

BACKGROUND

Field of the Various Embodiments

Embodiments of the present invention relate generally to text and speech analytics, and more particularly, to organizing and aggregating meetings into threaded representations.

Description of the Related Art

Recent technological advances have allowed meetings to be conducted more efficiently and effectively. For example, network-enabled devices have been deployed with solutions that allow people to conduct teleconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, insights and/or conclusions continue to be generated or derived from meetings on a manual basis. For example, an attendee may take notes during a meeting to identify and/or track important points, discussions, and/or decisions in the meeting. In another example, a user may be required to review an entire recording and/or transcript of a meeting to determine the content of the meeting. In a third example, a user may be required to manually identify a series of related meetings before analyzing the content and/or metadata of the meetings for patterns or trends related to the context, highlights, attendees, and/or other attributes of the meetings.

As the foregoing illustrates, what is needed is a technological improvement for automating or streamlining the generation of insights, key points, topics, and/or summaries for meetings and/or groups of related meetings.

SUMMARY

One embodiment of the present invention sets forth a technique for organizing meeting content. The technique includes generating, from a set of available meetings, a thread containing a collection of related meetings that share one or more attributes. The technique also includes aggregating data for the related meetings, where the data includes metadata for the related meetings and terms included in recordings of the related meetings. The technique further includes outputting at least a portion of the aggregated data within a summary of the thread.

At least one advantage of the disclosed techniques is that the summary expedites the review of meetings and/or the use of content discussed during the meetings at an aggregate level instead of at the individual meeting level. For example, a user may analyze the summary of a thread of related meetings and/or insights related to the thread to identify key points, topics, decisions, and/or participants in the thread; determine the effectiveness of the meetings in covering the agenda and/or the ability of the participants to collaborate during the meetings; identify trends and/or assess progress in the meetings over time; and/or identify actions that can be taken as result of the meetings. Consequently, the disclosed techniques provide technological improvements in interactive virtual meeting assistants and/or other applications or devices that are used to conduct, manage, schedule, and/or review meetings or other types of events.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
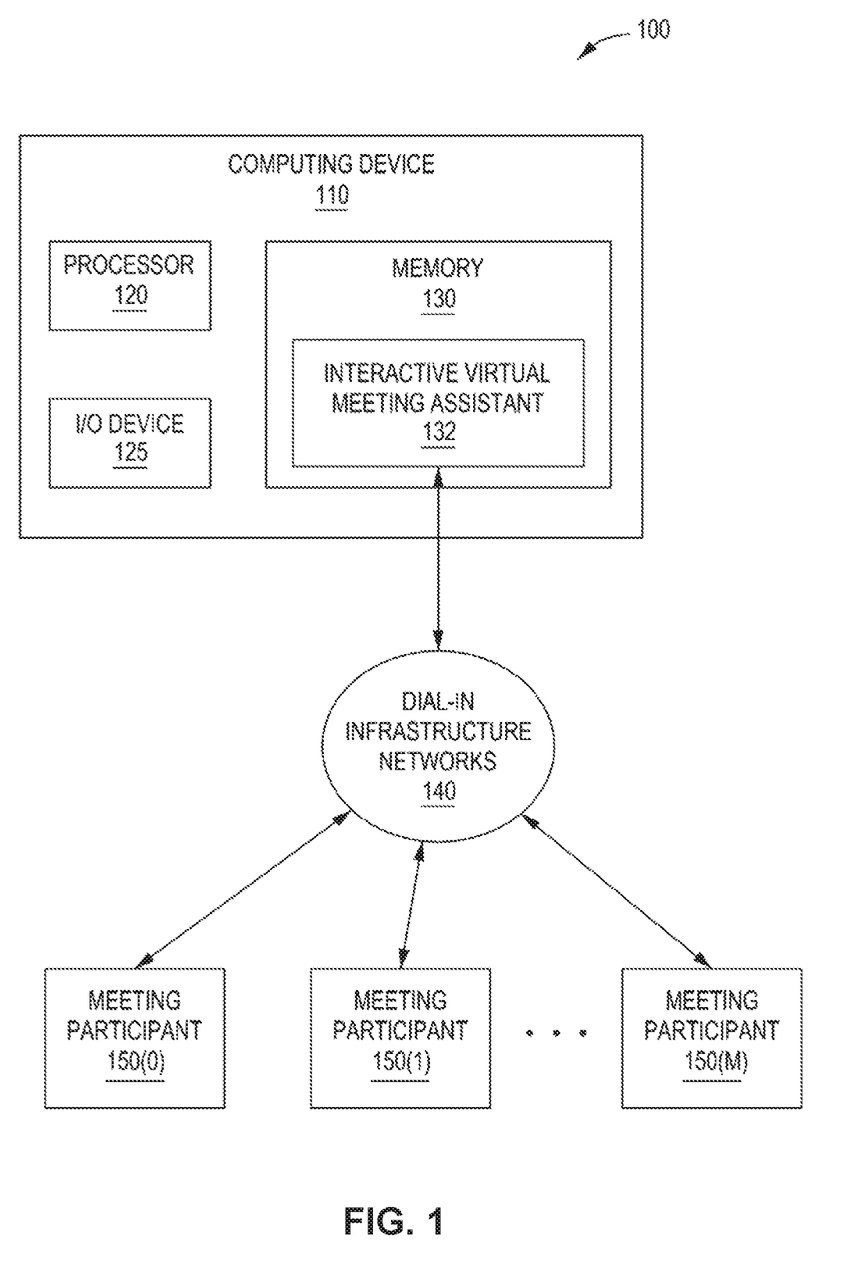
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 may be any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICERA, INC.

Dial-in infrastructure networks 140 may be any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 may include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to generate, track, and/or store metadata and recordings related to a meeting. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. Interactive virtual meeting assistant 132 may also, or instead, capture audio and/or video of the meeting and/or record notes or action items generated during the meeting. Interactive virtual meeting assistant 132 may further record "highlights" that are flagged by one or more meeting participants 150(0) to 150(m) as important. A meeting participant may activate recording of a highlight by issuing a voice command and/or other type of input to interactive virtual meeting assistant 132.

Interactive virtual meeting assistant 132 may use the metadata and recordings to generate summaries and insights related to the meeting. Such summaries and insights may include, but are not limited to, categories of important words and phrases in the meeting, locations of the words and phrases in a recording of the meeting, sentences containing the words and phrases, speakers of the words and phrases, and/or other context related to the words and phrases; measures of attributes such as inquisitiveness, quantitativeness, and/or sentiment in the meeting; and/or topics, themes, notable mentions, and/or entities that appear in the recording. The summaries and insights may then be displayed within a user interface to allow users to determine, without manually reviewing the meeting recording or transcript, the content and context of the meeting; important points, discussions, and/or decisions in the meeting; and/or the effectiveness or tone of the meeting.

As described in further detail below, interactive virtual meeting assistant 132 may further use the metadata and recordings to organize and/or aggregate multiple meetings into a threaded representation. For example, interactive virtual meeting assistant 132 may generate "threads" of related meetings that share attributes in the metadata and/or terms (e.g., words and/or phrases) found in the corresponding recordings. Interactive virtual meeting assistant 132 may then aggregate the metadata and/or terms into a summary of the thread and/or derive insights related to the aggregated information. Interactive virtual meeting assistant 132 may further output the summary and/or insights and/or process search queries related to the summary, insights, and/or thread. As a result, interactive virtual meeting assistant 132 may allow users to determine contexts, patterns, trends, important points, topics, and/or other information related to a group of meetings instead of at the individual meeting level.

Generating Summaries and Insights from Meeting Recordings

Figure 2:
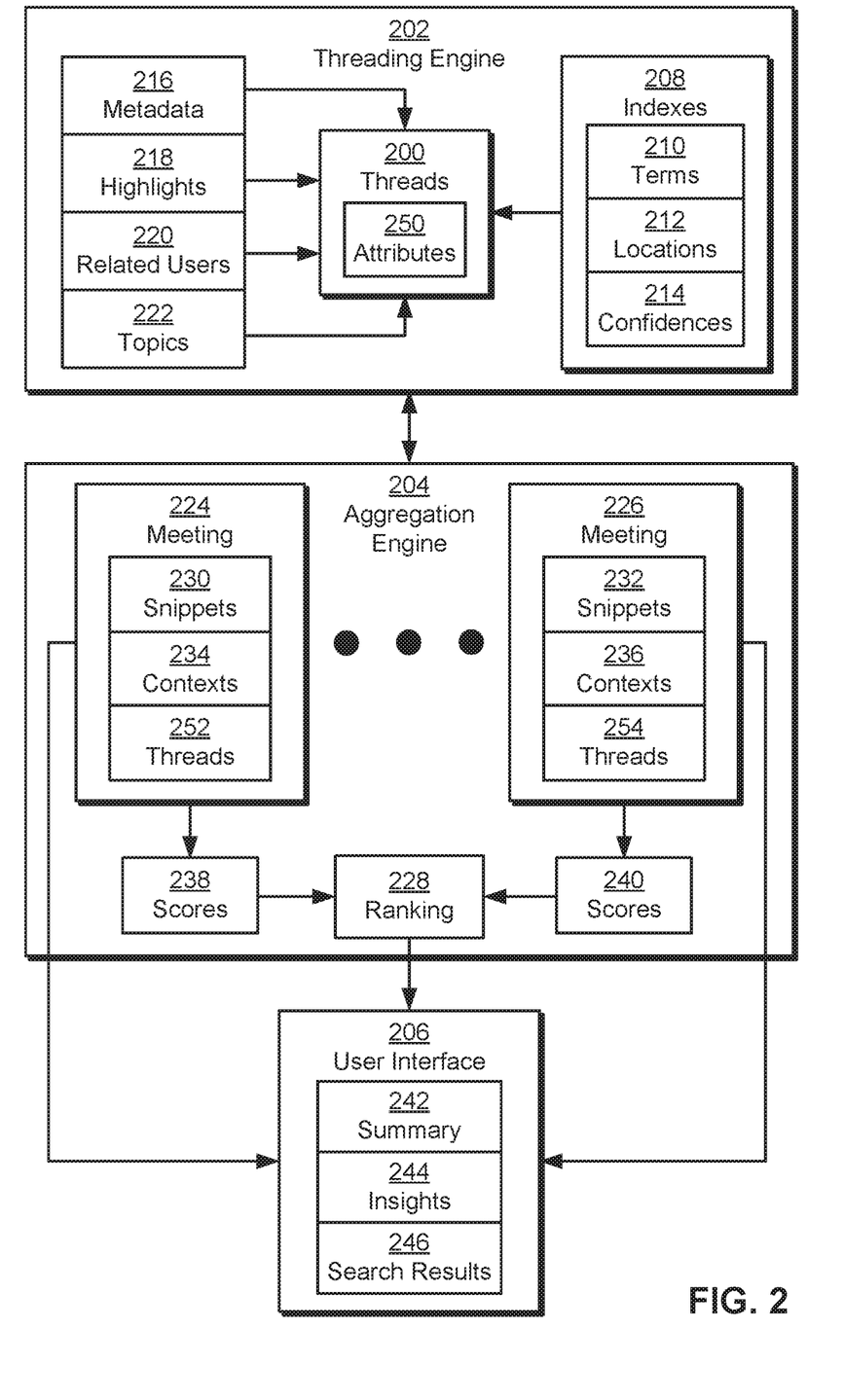
FIG. 2 is a more detailed illustration of functionality provided by the interactive virtual meeting assistant of FIG. 1, according to various embodiments of the present invention.

FIG. 2 is a more detailed illustration of functionality provided by interactive virtual meeting assistant 132 of FIG. 1, according to various embodiments of the present invention. As shown, the functionality may be provided by a threading engine 202 and an aggregation engine 204, which can be implemented as part of and/or separately from interactive virtual meeting assistant 132. Each of these components is described in further detail below.

Threading engine 202 may generate threads 200 containing collections of related meetings (e.g., meetings 224-226). Each thread may group a set of meetings by one or more shared attributes 250. For example, threading engine 202 may produce threads 200 containing meetings with the same or similar title, description, agenda, location (e.g., conference room, building, campus, teleconferencing ID, zip code, city, etc.), organizer, attendees, domain names of the attendees' email addresses, dates, user-defined tags or labels, and/or other attributes 250 from metadata 216 for the meetings.

Attributes 250 may be specified by a user interacting with a user interface 206 provided by interactive virtual meeting assistant 132 and/or another component of the system. For example, a user may interact with a voice user interface, graphical user interface, and/or other type of user interface 206 to define a thread containing meetings that share one or more attendees; one or more email domain names of the attendees; an organizer and/or inviter; one or more words in the title, description, or agenda; a conference room, building, campus, and/or other location; one or more days of the week, days or weeks in a month (e.g., the fifth of every month, the second week of every month, etc.), or other time-based attributes 250; and/or one or more tags or labels. In another example, a user may manually populate a thread with individual meetings and/or meetings from one or more other threads 200.

Threads 200 may also, or instead, be generated from pre-defined criteria and/or rules. For example, threading engine 202 may automatically generate threads 200 of related meetings to contain the same unique identifier (UID) of an event series. In another example, threading engine 202 may automatically organize meetings under threads 200 with the same or similar title, description, agenda, attendee, email domain name, organizer, location, recurrence (e.g., daily, weekly, biweekly, monthly, etc.), tag, label, and/or other attributes 250.

Threads 200 may also, or instead, be generated from dynamic groupings of attributes 250. Threading engine 202 may group attribute 250 based on various criteria and/or rules. In one example, threading engine 202 may generate threads 200 of meetings that are attended by groups of related users 220. Each group may include users that repeatedly interact with one another and/or share common interests, attributes 250, and/or behavior.

Groups of related users 220 may be identified using a clustering technique. For example, threading engine 202 may use a community detection technique, expectation maximization technique, a mixture model, and/or an ensemble of multiple techniques to identify subpopulations of related users 220 from a larger set of users. When a group of related users 220 is identified, threading engine 202 may create a thread of meetings that include some or all of the users as attendees. For example, threading engine 202 may include a meeting in a thread for a group of users when the meeting contains a minimum number or percentage of users in the group as attendees.

Threading engine 202 may also, or instead, select or adjust a minimum and/or maximum number of users in each group. For example, threading engine 202 may model users and interactions associated with the meetings in a graph. Nodes in the graph may represent users, and edges between pairs of nodes in the graph may represent relationships and/or interactions between the corresponding users. Each edge may be assigned an "affinity score" representing the strength of the connection between the corresponding pair of users. The affinity score may be calculated using the number of meetings that list both users as attendees, the number of emails containing both users, the number of instant messages containing both users, the degree of separation between the users in another network (e.g., an organizational chart, a social network, a professional network, etc.), and/or other metrics that reflect the amount of interaction or familiarity between the users.

Threading engine 202 may use the graph to identify "cliques" of users that are connected to one another with affinity scores that exceed a threshold. The size of a clique may be selected to optimize for user engagement within the clique (e.g., the average affinity score in each clique, the average number of interactions within each clique, the number of meetings involving each clique, etc.). Cliques that have significant overlap in users may optionally be merged to form a larger community of users. Threading engine 202 may create threads 200 representing individual cliques and/or communities formed from multiple cliques and populate each thread with meetings attending by the corresponding clique or community.

Threading engine 202 may optionally filter meetings in a thread representing a group of related users 220. For example, threading engine 202 may limit a thread to contain meetings that span a certain time window (e.g., a range of dates). In another example, threading engine 202 may configure a thread so that each user in the corresponding group can only view and/or access meetings in the thread for which the user has been granted the corresponding permissions.

Threading engine 202 and/or another component may perform additional processing related to groups of related users 220 and/or threads 200 of meetings associated with the groups. For example, the component may generate organizational charts and/or team structures that reflect the interaction and communication found in groups of related users 220.

In another example, the component may create a language model for a group of related users 220 and update the language model with words from meeting titles, descriptions, agendas, and/or other metadata 216 for meetings attended by the group and/or user-provided corrections to transcriptions of the meetings. In other words, the component may generate a custom language model for the group that tracks jargon and/or vocabulary used by the group. The component may then use the language model to generate transcriptions and/or insights from subsequent meetings attended by the group, thereby improving the accuracy of the transcriptions and/or relevance of the insights to the group.

Threading engine 202 may also generate threads 200 representing common topics 222 in the meetings. Topics 220 may be identified from transcripts of the meetings and/or indexes 208 of the transcripts.

Threading engine 202 and/or another component of the system may use multiple automatic speech recognition (ASR) engines or techniques to generate a number of different transcript lattices from recordings of the meetings. Each transcript lattice may include a set of terms 210, locations 212 of terms 212 in the corresponding recording, and confidences 214 in terms 210. Terms 210 may include words, phrases, morphemes, n-grams, syllables, phonemes, and/or other representations of speech or text that is extracted from the recording. When ASR techniques are used to generate non-word terms 210 (e.g., morphemes, phonemes, syllables, etc.) from the recording, the non-word terms may be converted into words. The words may then be included in the corresponding transcript lattices 200, in lieu of or in addition to the non-word terms used to produce the words.

Locations 212 may represent the positions of terms 210 in the recording. For example, each location may specify a start and end timestamp for each term, a start timestamp and a duration for each term, and/or another representation of the portion of the recording occupied by the term.

Confidences 214 may include measures of accuracy in terms 210 generated by the ASR techniques from the recording. For example, each confidence may be represented by a value with a range of 0 to 1, which represents the probability that a word predicted by the corresponding ASR engine exists at the corresponding location.

The transcript lattices may be converted into and/or represented using time-marked conversation (ctm) files. Each CTM file may include a series of lines, with each line representing a possible transcription of a time-marked interval. For example, a line in a CTM file may adhere to the following format:

<start offset> <duration> <word> <confidence>

In turn, an example CTM file may include the following lines:

4.16 0.41 hi 1.00
    4.66 0.14 the 0.55
    4.65 0.42 there 0.69
    . . .

The first line includes a start offset of 4.16 seconds, a duration of 0.41 seconds, a word of "hi," and a confidence of 1.00. The second line includes a start offset of 4.66 seconds, a duration of 0.14 seconds, a word of "the," and a confidence of 0.55. The third line includes a start offset of 4.65 seconds, a duration of 0.42 seconds, a word of "there," and a confidence of 0.69. Because the second and third lines include overlapping time intervals, the corresponding words of "the" and "there" may be contemporary words (i.e., words that occur at the same time in the recording).

To facilitate processing of speech extracted from the recordings, the component may convert the transcript lattices into indexes 208. Each index may include an inverted index of terms 210 and the corresponding locations 212 and confidences 214 in a recording. The index may optionally include additional information, such as a list of related terms (e.g., synonyms and/or semantically similar terms for a given term), one or more ASR engines used to produce the term at each location, and/or a contemporary word count representing the number of co-occurring words identified at the location of each term.

For example, the index may include the following representation:

```
{
  "hi": {
    "relatedTerms": ["hello", "hey"],
    "locations": [{
      "start": 4.16,
      "end": 4.57,
      "confidence": 1.00,
      "asr": "A",
      "contemporaryCount": 4
    }, {
      "start": 1.09,
      "end": 1.46,
      "confidence": 0.89,
      "asr": "B",
      "contemporaryCount": 6
    }]
  },
  ...
}
```

The above representation includes an entry for the word of "hi." The entry includes related terms of "hello" and "hey," followed by a list of "locations" (e.g., locations 212) of the word in the recording. Each location is represented by a "start" and "end" timestamp, a "confidence" in the word at that location, an "asr" used to produce the location, and a "contemporaryCount" indicating the number of co-occurring words within the word's start and end timestamps.

Indexes 208 may optionally be filtered to improve the accuracy of the corresponding transcripts or transcript lattices. For example, threading engine 202 and/or another component may use a minimum confidence threshold to remove locations 212 with low confidences 214 from indexes 208. In another example, the component may apply a maximum contemporary word count threshold to remove locations 212 with high contemporary word counts from indexes 208. In a third example, the component may apply a minimum ASR count threshold to ensure that consensus is reached by a minimum number of ASR engines in predicting terms 210 at locations 212. In a fourth example, the component may remove locations 212 with durations of terms 210 that are too short or too long for the corresponding language. In a fifth example, the component may apply a blacklist of profane or otherwise restricted words to indexes 208. In a sixth example, the component may remove stop words and/or high-frequency words from indexes 208. In a seventh example, the component may limit terms 210 in indexes 208 to certain parts of speech and/or word forms. In an eighth example, the component may group related terms in indexes 208 after performing stemming, semantic analysis, and/or lemmatization of terms 210.

After indexes 208 are created, threading engine 202 may use latent semantic analysis (LSA), latent Dirichlet allocation (LDA), probabilistic latent semantic indexing (PLSI), and/or another topic modeling technique to detect topics 222 in the corresponding meetings. Threading engine 202 may then select topics 222 with confidence scores that are higher than a threshold and group the meetings into threads 200 with common topics 222. For example, threading engine 202 may include all meetings with a "budget" topic in a thread representing the topic.

For each thread created by threading engine 202, aggregation engine 204 aggregates data for meetings (e.g., meetings 224-226) in the thread into a summary 242 of the thread. Summary 242 may include highlights 218, key points, topics 222, concepts, and/or other content or themes that are found in the meetings.

To generate summary 242, aggregation engine 204 may obtain snippets 230-232 of voice activity in the meetings. For example, aggregation engine 204 and/or another component may use a voice activity detection technique to identify snippets 230-232 as time intervals that contain voice activity in recordings of the corresponding meetings. The voice activity detection technique may identify and/or filter noise in the recordings and classify fixed-duration frames (e.g., one-second frames) of the remaining audio signal as containing or not containing speech. Snippets 230-232 may then be defined and/or represented as consecutive frames in the recording that are classified as containing speech.

After snippets 230-232 are identified, the component may optionally aggregate consecutive snippets into larger intervals of voice activity, such as phrases, sentences, paragraphs, and/or intervals containing speech from individual users. The component may also, or instead, filter snippets 230-232 to include user-specified highlights 218 and/or other portions of the meetings that are deemed as important or noteworthy.

Next, aggregation engine 204 may input snippets 230-232 and associated features into one or more machine learning models (e.g., neural networks, support vector machines, regression models, tree-based models, ensemble models, etc.). For example, the features may include contexts 234-236 that contain a certain number of words, phrases, sentences, and/or snippets before and/or after each snippet to be scored.

In turn, the machine learning models may output scores 238-240 representing estimates of the importance or significance of the corresponding snippets 230-232. For example, a machine learning model may output a higher score when the corresponding snippet and/or associated context include words and/or phrases that are relatively rare or semantically significant and a lower score when the corresponding snippet and/or associated context include words and/or phrases that are relatively common or semantically insignificant.

After scores 238-240 are generated for at least two of the relevant snippets 230-232 in a thread of meetings 224-226, aggregation engine 204 may produce a ranking 228 of snippets 230-232 by scores 238-240 and generate summary 242 based on ranking 228. For example, aggregation engine 204 may rank snippets 230-232 by descending score and select a pre-specified number of highest-ranked snippets 230-232 and/or a variable number of snippets 230-232 with scores that exceed a threshold for inclusion in summary 242.

After summary 242 is populated with the selected snippets, aggregation engine 204 may optionally merge adjacent snippets in summary 242 when a temporal separation between the adjacent snippets falls below a threshold. For example, aggregation engine 204 may combine two adjacent snippets into a single snippet in summary 242 when the start of the second snippet is within a certain number of seconds from the end of the first snippet.

Aggregation engine 204 and/or another component may additionally generate insights 224 related to summary 242 and/or the corresponding thread. For example, the component may apply natural language processing, topic mining, sentiment analysis, named entity recognition, and/or other types of text-analysis techniques to indexes 208 and/or summary 242 to assess the inquisitiveness, quantitativeness, contentiousness, sentiment, and/or level of action orientation in the thread and/or identify topics 222, themes, and/or entities (e.g., users, organizations, places, products, etc.) in the thread.

User interface 206 may then output one or more representations of summary 242 and/or insights 244 to a user. For example, user interface 206 may include a "timeline" of important snippets in the thread represented by summary 242. The user may view transcriptions of the snippets within the timeline and/or play audio containing the snippets. User interface 206 may also, or instead, output representations of insights 244 as visualizations indicating levels of inquisitiveness, quantitativeness, contentiousness, and/or action orientation in the meetings; a "word cloud" of topics, themes, and/or entities in the meetings; and/or a representation of sentiment in the meetings.

User interface 206 may further output a representation of summary 242 that includes groupings of important words, phrases, and/or snippets under categories that may be interesting or relevant to the user. Such categories may include, but are not limited to, curated categories, dynamic categories, and/or user-defined categories.

Curated categories may include standard, statically defined categories that are created by a product team associated with interactive virtual meeting assistant 132 and/or other components involved in processing recordings of meetings and/or other events. For example, curated categories for meetings and/or threads 200 of related meetings may include, but are not limited to, questions, action items, dates and times, requests, sales, sales processes, introductions, business jargon, numbers, locations, commitments, strong reactions, and/or idioms and sayings. Words and phrases that can be found under the "locations" category may include, but are not limited to, cities, counties, states, countries, regions, bodies of water, mountains, and/or other geographic locations. Words and phrases that can be found under the "questions" category may include, but are not limited to, "what about," "do you know," "will you," "what are," "where are," "why do," "what do," "where do," "how do," "can you," "could you," "what is," "where is," "how are," and/or "how will." Words and phrases that can be found under the "dates and times" category may include, but are not limited to, days, months, weeks, years, times, time intervals, and/or other representations of dates and times.

Dynamic categories may include categories that are generated based on metadata and/or other information describing the meetings. For example, the dynamic categories may represent and/or be generated from the meetings' agendas, summaries, descriptions, schedules, locations, lists of participants, inviters or organizers, and/or highlights 218. In turn, the dynamic categories may be populated with words and phrases from the corresponding metadata. Continuing with the above example, the "agenda" category may include words and phrases from the meeting's agenda; the "list of participants" category may include names, titles, descriptions, employers, email addresses, and/or other personal information for the meeting's attendees; and the "schedule" category may include the date, time and/or duration of the meeting.

User-defined categories may include categories that are added by users that are interested in reviewing a meeting or thread of meetings. For example, the user-defined categories may represent topics that are of interest to an attendee, meeting organizer, and/or new member of a team that participates in meetings within a thread. In another example, user-defined categories may include a category of words a user would like to be identified in the meeting and/or a category of words the user would like to avoid being identified in the meeting. After a user-defined category is created, a user may add words and phrases to the category for subsequent use in generating summary 242.

User interface 206 may additionally output search results 246 associated with summary 242, insights 244, and/or other representations of the corresponding threads 200. A user may submit a query containing a search term through user interface 206, and aggregation engine 204 and/or another component may generate search results 246 as snippets 230-232, metadata 216, highlights 218, and/or other data that contains the search term. The component may then display and/or otherwise output some or all search results 246 within user interface 206.

More specifically, the component may order and/or select search results 246 based on scores (e.g., scores 238-240) associated with the corresponding snippets 230-232, metadata 216, highlights 218, and/or data to be searched. For example, the component may rank search results 246 by descending score and select a certain number of highest-ranked search results 246 for display within one or more pages or screens of user interface 206.

As described above, the scores may include measures of relevance and/or importance that are estimated by one or more machine learning models. The scores may also, or instead, be based on metrics such as term frequency-inverse document frequency (tf-idf), personalization criteria (e.g., user profiles, search histories, collaborative filtering techniques, etc.), and/or other factors (e.g., age, number of meetings in a thread, manual or dynamic generation of a thread, attributes used to generate a thread, etc.).

The scores may further be based on threads 252-254 to which a set of meetings associated with a given thread or set of search results 246 belong. For example, the score for a given search result may include a "MeetingRank" of the meeting to which the search result belongs. The MeetingRank may be calculated using the following formula:

$$MR(m_j) = \frac{1-d}{N} + d \sum_{t_i \ni m_j} \frac{TR(t_i)}{L(t_i)}$$

In the above formula, "MR($m_j$)" represents the MeetingRank of meeting $m_j$, "d" is a damping factor that is less than 1, "L($t_j$)" represents the number of meetings in each thread "$t_j$" to which the meeting belongs, and "TR($t_j$)" represents a "ThreadRank" of the thread.

In turn, the ThreadRank may be calculated using the following formula:

$$TR(t_i) = \sum_{m_j \in t_i} MR(m_j)$$

In the above formula, the ThreadRank of the ith thread is calculated as the summation of MeetingRank values for all meetings $m_j$ in the thread.

By incorporating MeetingRank and ThreadRank into scores that are used to rank and/or select search results 246, the component may allow search results 246 associated with important or prominent meetings and/or threads to be prioritized over search results 246 associated with less important or less prominent meetings and/or threads. The component may optionally extend the use of MeetingRank and ThreadRank to scores 238-240 that are used to generate summary 242 and/or other ordered lists from data for one or more meetings.

Figure 3A:
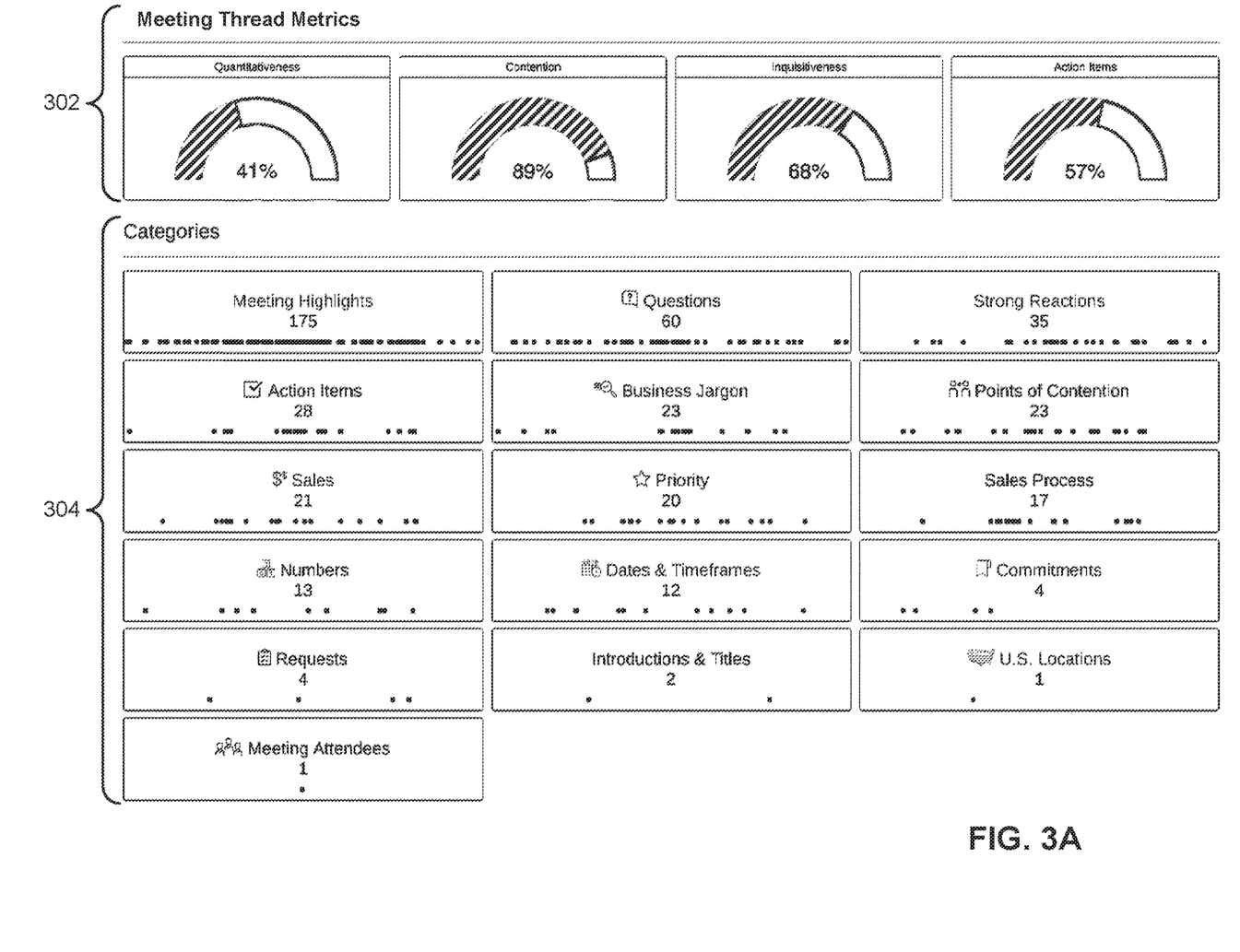
FIGS. 3A-3B collectively illustrate an example user interface associated with the virtual meeting assistant, according to various embodiments of the present invention.
Figure 3B:
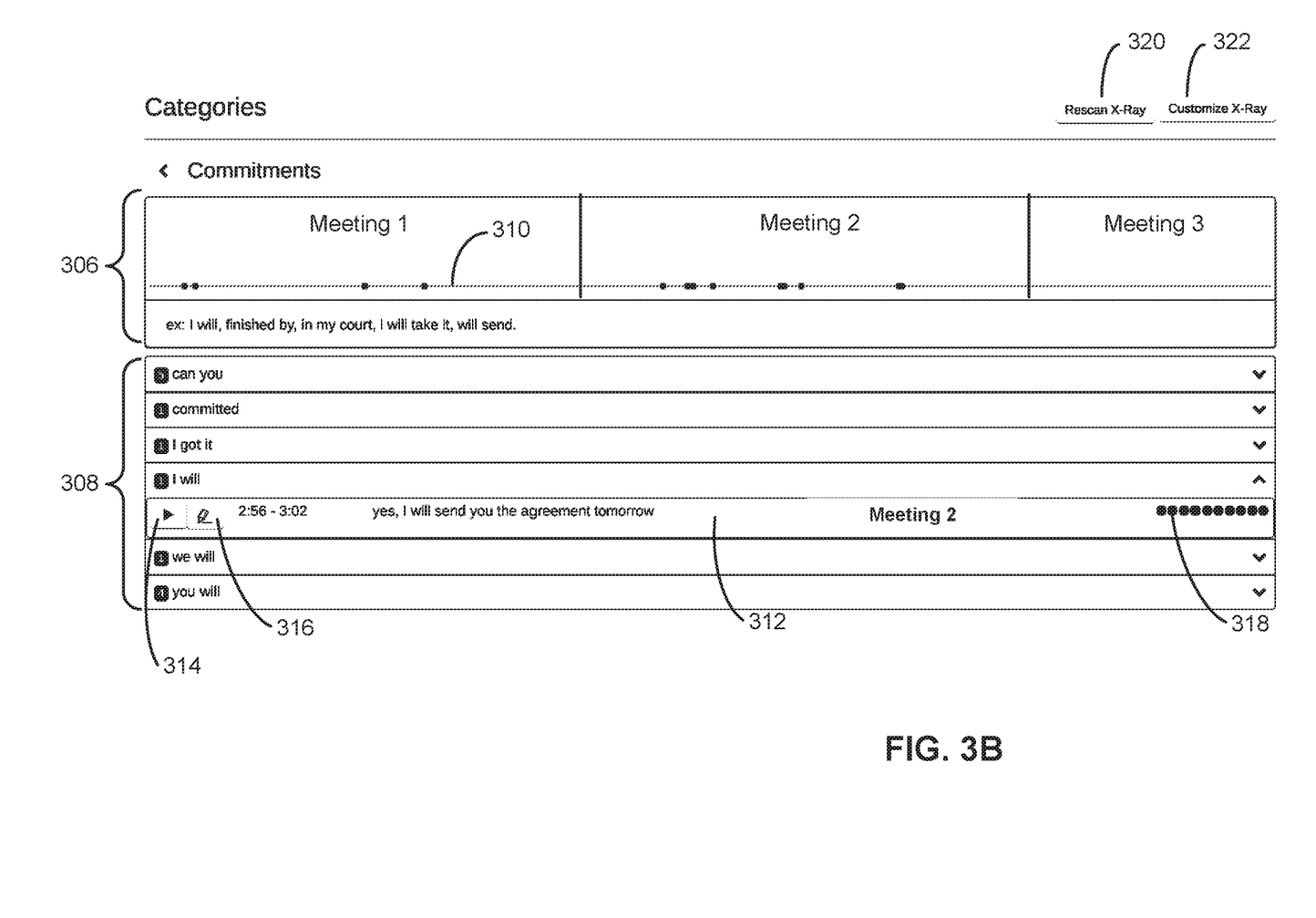

FIGS. 3A-3B collectively illustrate an example user interface 206 associated with the virtual meeting assistant, according to various embodiments of the present invention. As shown in FIG. 3A, a screen in the example user interface 206 includes a first portion 302 representing "Meeting Thread Metrics" and a second portion 304 representing "Categories" for a given meeting thread.

Portion 302 includes graphical representations of insights 244 related to measurable attributes of the thread. In particular, portion 302 may include gauge charts that depict overall measurements of attributes such as "Quantitativeness," "Contention," "Inquisitiveness," and "Action Items" across meetings in the thread. A user may click on each gauge chart to view additional information related to the corresponding attribute, such as portions of the meeting recordings that contribute to the attribute and/or detract from the attribute.

Portion 304 includes graphical representations of categories of words and phrases found in the meetings. Such categories may include, but are not limited to, "Meeting Highlights," "Questions," "Strong Reactions," "Action Items," "Business Jargon," "Points of Contention," "Sales," "Priority," "Sales Process," "Numbers," "Dates & Timeframes," "Commitments," "Requests," "Introductions & Titles," "U.S. Locations," and "Meeting Attendees." Each category may also include a series of points along a timeline that represent locations in the meeting recordings of words and phrases in the category. The user may click on a category to view additional information related to the category.

As shown in FIG. 3B, user interface 206 includes a graphical representation of additional information related to the "Commitments" category. The screen of FIG. 3B may be shown after the user clicks on the "Commitments" category within the user interface of FIG. 3A, searches for the category, and/or otherwise navigates to the screen from another portion of user interface 206.

The screen of FIG. 3B includes a first portion 306 representing an overview of the "Commitments" category with respect to the thread. The overview includes a timeline 310 of three meetings (i.e., "Meeting 1," "Meeting 2," "Meeting 3") containing content related to the "Commitments" category, with points along the timeline representing the locations in the meetings of words and phrases in the category. The overview also provides examples of words and phrases in the category that are found in the recording (i.e., "ex: I will, finished by, in my court, I will take it, will send.").

A second portion 308 of the screen includes a list of words and phrases in the meetings that belong to the category. The list may optionally be sorted by scores associated with the corresponding words and phrases, which may be calculated using metrics such as tf-idf, MeetingRank, and/or ThreadRank.

The user may click on a word or phrase in the list to view instances of the word or phrase in the meetings. In particular, portion 308 includes a module 312 representing an instance of the "I will" phrase. Module 312 includes a range of time ("2:56-3:02") spanned by a sentence that includes the phrase ("yes, I will send you the agreement tomorrow"), as well as the meeting ("Meeting 2") in which the phrase is found. Module 312 also includes a number of other user-interface elements, such as a button 314 that allows the user to play the portion of the meeting's recording that contains the sentence, another button 316 that allows the user to modify the sentence, and/or a rating 318 representing the level of confidence in the prediction of the phrase and/or sentence.

The upper right corner of the screen includes two additional buttons 320-322 for accessing other portions of user interface 206. The user may click button 320 ("Rescan X-Ray") to navigate to a screen of user interface 206 for producing a new summary and/or set of insights from the same thread. The user may click button 322 ("Customize X-Ray") to navigate to a screen of user interface 206 for customizing the generation of the summary and/or insights from the thread.

Figure 4:
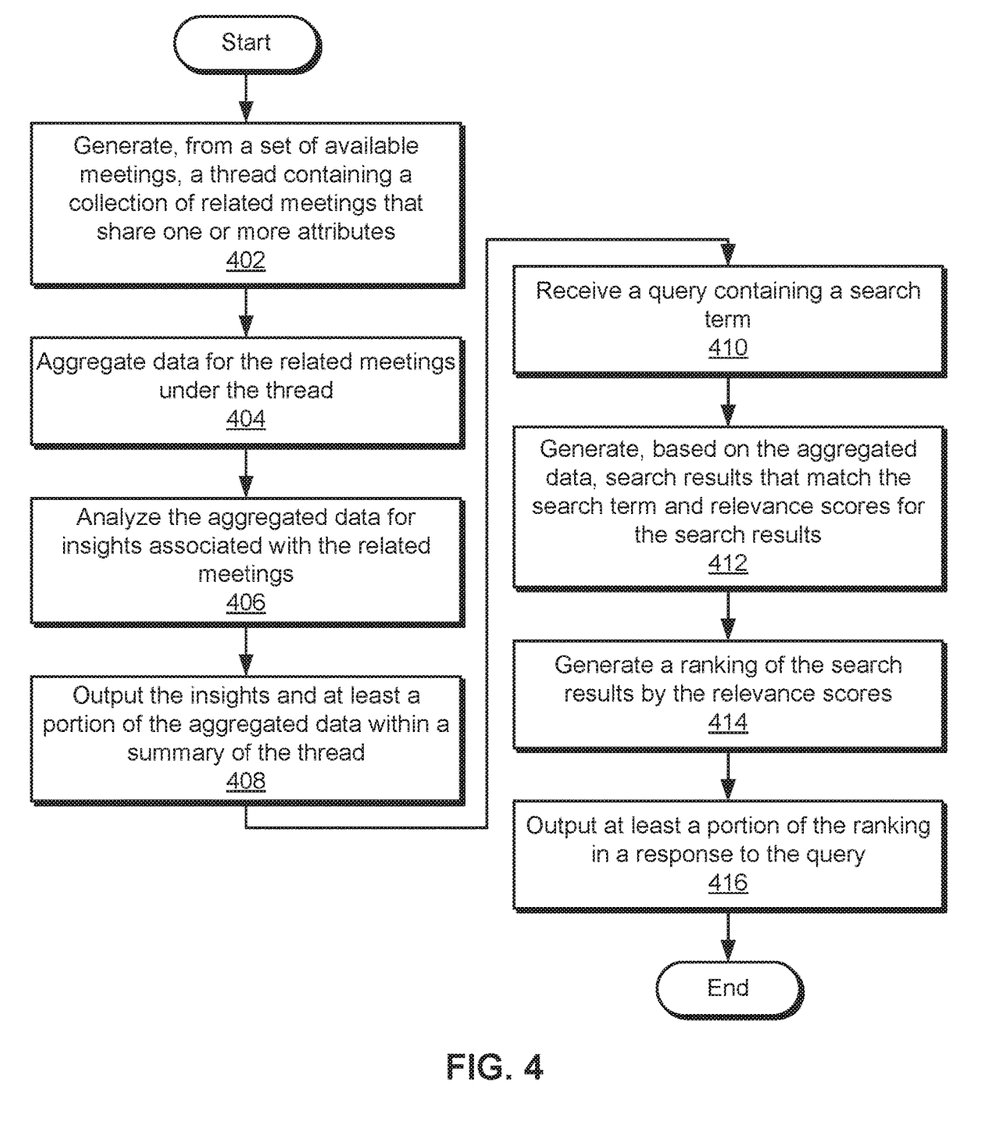
FIG. 4 is a flow diagram of method steps for organizing and aggregating meetings into a threaded representation, according to various embodiments of the present invention.

FIG. 4 is a flow diagram of method steps for organizing and aggregating meetings into a threaded representation, according to various embodiments of the present invention. Although the method steps are described in conjunction with the systems of FIGS. 1-2, persons skilled in the art will understand that any system configured to perform the method steps, in any order, is within the scope of the present invention.

As shown, threading engine 202 initially generates 402, from a set of available meetings, a thread containing a collection of related meetings that share one or more attributes. For example, threading engine 202 may obtain attribute values for one or more attribute types from a user and populate a corresponding thread with a group of meetings that share the attribute values. In another example, threading engine 202 may detect topics found in the set of available meetings and generate the collection of related meetings to share one or more of the topics. In a third example, threading engine 202 may apply a clustering technique to the attributes to identify a group of related users and generate the collection of related meetings to share the group of related users as attendees.

Next, aggregation engine 204 aggregates 404 data for the related meetings included in the thread. For example, aggregation engine 204 may aggregate metadata for the meetings and/or indexes containing terms included in recordings of the meetings, locations of the terms in the recordings, and/or confidences in the terms into a database and/or other type of data store. During aggregation of the data, aggregation engine 204 may generate scores for the data and/or rank the data by the scores, as described in further detail below with respect to FIG. 5.

Aggregation engine 204 analyzes 406 the aggregated data for insights associated with the related meetings. The insights may include, but are not limited to, an inquisitiveness, a quantitativeness, a sentiment, a topic, a theme, and/or an entity associated with the related meetings.

Aggregation engine 204 then outputs 408 the insights and at least a portion of the aggregated data within a summary of the thread. For example, aggregation engine 204 may display timelines, charts, visualizations, and/or other graphical representations of the summary and insights in a user interface, such as user interface 206 of FIG. 2. A user may interact with the displayed summary and insights to assess the content, gist, tone, effectiveness, level of participation, and/or other characteristics of meetings in the thread without manually identifying the meetings by the corresponding commonality and/or reviewing the data and/or metadata for each meeting in the thread.

Aggregation engine 204 also receives 410 a query containing a search term and generates 412, based on the aggregated data, search results that match the search term and relevance scores for the search results. For example, aggregation engine 204 may obtain the search results by searching indexes of the meeting recordings for words, phrases, and/or snippets matching the search term. Aggregation engine 204 may then generate relevance scores for the search results using metrics such as tf-idf and/or ThreadRank or MeetingRank metrics reflecting threads associated with the search results.

Aggregation engine 204 then generates 414 a ranking of the search results by the relevance scores and outputs 416 at least a portion of the ranking in a response to the query. For example, aggregation engine 204 may rank the search results by descending relevance score and select a highest-ranked subset of search results for inclusion in the response. As a result, the response may include search results that are determined by aggregation engine 204 to be the most relevant to the query.

Figure 5:
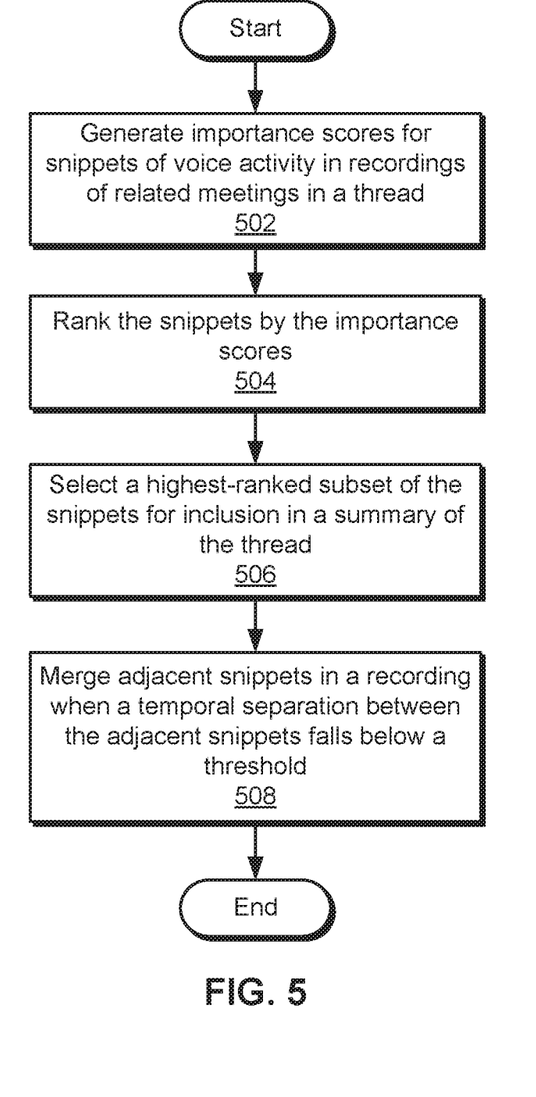
FIG. 5 is a flow diagram of method steps for generating a summary of a thread containing a collection of related meetings, according to various embodiments of the present invention.

FIG. 5 is a flow diagram of method steps for generating a summary of a thread containing a collection of related meetings, according to various embodiments of the present invention. Although the method steps are described in conjunction with the systems of FIGS. 1-2, persons skilled in the art will understand that any system configured to perform the method steps, in any order, is within the scope of the present invention.

As shown, aggregation engine 204 generates 502 importance scores for snippets of voice activity in recordings of related meetings in a thread. For example, aggregation engine 204 may apply a machine learning model to each snippet and/or a context of the snippet (e.g., a number of sentences or snippets before and/or after the snippet) to produce an importance score that reflects the relative importance or significance of the snippet's content. In another example, aggregation engine 204 may calculate the importance score based on one or more metrics (e.g., tf-idf, average word length, ThreadRank, MeetingRank, etc.) associated with the snippet and/or context.

Next, aggregation engine 204 ranks 504 the snippets by the importance scores and selects 506 a highest-ranked subset of the snippets for inclusion in the summary of the thread. For example, aggregation engine 204 may order the snippets by descending importance score and select a pre-specified number of snippets from the top of the ranking and/or a variable number of snippets with importance scores that exceed a threshold.

Aggregation engine 204 then merges 508 adjacent snippets in a recording when a temporal separation between the adjacent snippets falls below a threshold. For example, aggregation engine 204 may combine two or more adjacent snippets into one snippet when each pair of adjacent snippets is separated by less than a threshold number of seconds.

In sum, the disclosed techniques can be used to organize and aggregate meetings into threaded representations. First, a thread is defined to include meetings that share user-specified attributes, pre-defined attributes, groups of related users, topics, and/or other types of commonality. Next, transcripts of the meetings, metadata for the meetings, and/or other data related to the meetings is aggregated under the thread and used to generate a summary of the thread and/or insights related to the thread. The summary and/or insights are then outputted to provide an overview of content and/or metadata in the thread, and searches related to content and/or metadata are processed based on metrics such as tf-idf and/or the threads to which the corresponding meetings belong.

In turn, the disclosed techniques may improve the management or review of meetings and/or the use of content discussed during the meetings at an aggregate level instead of the individual meeting level. For example, a user may analyze the summary of a thread of related meetings and/or insights related to the thread to identify key points, topics, decisions, and/or participants in the thread; determine the effectiveness of the meetings in covering the agenda and/or the ability of the participants to collaborate during the meetings; identify trends and/or assess progress in the meetings over time; and/or identify actions that can be taken as result of the meetings. Consequently, the disclosed techniques provide technological improvements in interactive virtual meeting assistant 132 and/or other applications or devices that are used to conduct, manage, schedule, and/or review meetings or other types of events.

1. In some embodiments, a method for organizing meeting content, comprising generating, from a set of available meetings, a thread comprising a collection of related meetings that share one or more attributes, aggregating data for the related meetings, wherein the data comprises metadata for the related meetings and terms included in recordings of the related meetings, and outputting at least a portion of the aggregated data within a summary of the thread.

2. The method of clause 1, further comprising receiving a query comprising a search term, generating, based on the aggregated data, search results that match the search term and relevance scores for the search results, generating a ranking of the search results based on the relevance scores, and outputting, based on a ranking, at least a portion of the search results in a response to the query.

3. The method of clause 1 or 2, wherein the search results are generated from indexes comprising the terms included in the recordings and locations of the terms in the recordings.

4. The method of any of clauses 1-3, wherein the relevance scores are generated based on at least one of a term frequency-inverse document frequency (tf-idf) and threads associated with the set of search results.

5. The method of any of clauses 1-4, wherein the search results comprise at least one of a snippet of a recording, a transcript of the snippet, and a highlight in a meeting.

6. The method of any of clauses 1-5, further comprising analyzing the aggregated data for insights associated with the related meetings, and outputting the insights with the summary.

7. The method of any of clauses 1-6, wherein the insights comprise at least one of an inquisitiveness, a quantitativeness, a sentiment, a topic, a theme, and an entity.

8. The method of any of clauses 1-7, wherein generating the thread comprising the collection of related meetings that share the one or more attributes comprises detecting topics found in the set of available meetings, and generating the collection of related meetings to share one or more of the topics.

9. The method of any of clauses 1-8, wherein generating the thread comprising the collection of related meetings that share the one or more attributes comprises applying a clustering technique to the one or more attributes to identify a group of related users, and generating the collection of related meetings to share the group of related users as attendees.

10. The method of any of clauses 1-9, wherein generating the thread comprising the collection of related meetings that share the one or more attributes comprises obtaining the one or more attributes from a user.

11. The method of any of clauses 1-10, wherein aggregating the data for the related meetings under the thread comprises generating importance scores for snippets of voice activity in the recordings based on content of the snippets and contexts associated with the snippets, ranking the snippets based on the importance scores, and selecting, based on the ranking, a subset of the snippets for inclusion in the summary.

12. The method of any of clauses 1-11, wherein aggregating the data for the related meetings under the collection further comprises merging adjacent snippets in a recording when a temporal separation between the adjacent snippets falls below a threshold.

13. The method of any of clauses 1-12, wherein the metadata comprises at least one of a title, a location, a description, an agenda, a time, a duration, a list of participants, an inviter, an organizer, a domain name, a tag, and a label.

14. In some embodiments, one or more non-transitory computer readable media storing instructions that, when executed by one or more processors, cause the one or more processors to perform the steps of generating, from a set of available meetings, a thread comprising a collection of related meetings that share one or more attributes, aggregating data for the related meetings, wherein the data comprises metadata for the related meetings and terms included in recordings of the related meetings, and outputting at least a portion of the aggregated data within a summary of the thread.

15. The one or more non-transitory computer readable media of clause 14, wherein the steps further comprise receiving a query comprising a search term, generating, based on the aggregated data, search results that match the search term and relevance scores for the search results, generating, based on the relevance scores, a ranking of the search results, and outputting at least a portion of the ranking in a response to the query.

16. The one or more non-transitory computer readable media of clause 14 or 15, wherein the relevance scores are generated based on at least one of a term frequency-inverse document frequency (tf-idf) and threads associated with the set of search results.

17. The one or more non-transitory computer readable media of any of clauses 14-16, wherein generating the thread comprising the collection of related meetings that share the one or more attributes comprises detecting topics found in the set of available meetings, and generating the collection of related meetings to share one or more of the topics.

18. The one or more non-transitory computer readable media of any of clauses 14-17, wherein generating the thread comprising the collection of related meetings that share the one or more attributes comprises applying a clustering technique to the one or more attributes to identify a group of related users, and generating the collection of related meetings to share the group of related users as attendees.

19. The one or more non-transitory computer readable media of any of clauses 14-18, wherein aggregating the data for the related meetings under the thread comprises generating importance scores for snippets of voice activity in the recordings based on the content of the snippets and contexts associated with the snippets, ranking the snippets by the importance scores, and selecting, based on the ranking, at least a subset of the snippets for inclusion in the summary.

20. In some embodiments, a system, comprising one or more memory units that stores instructions, and one or more processors that are coupled to the one or more memory units and, when executing the instructions, are configured to generate, from a set of available meetings, a thread comprising a collection of related meetings that share one or more attributes, aggregate data for the related meetings, wherein the data comprises metadata for the related meetings and terms included in recordings of the related meetings, and output at least a portion of the aggregated data within a summary of the thread.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for organizing meeting content, comprising:
generating, from a set of available meetings, a thread comprising a collection of related meetings that share one or more attributes;
aggregating data for the related meetings, wherein the data comprises metadata for the related meetings and terms included in recordings of the related meetings, wherein aggregating the data for the related meetings under the collection further comprises merging adjacent snippets in a recording when a temporal separation between the adjacent snippets falls below a threshold;
analyzing the aggregated data for insights associated with the related meetings; and
outputting at least a portion of the aggregated data within a summary of the thread, wherein outputting the at least a portion of the aggregated data within the summary of the thread comprises:
generating scores for snippets of voice activity in the recordings based on content of the snippets and contexts associated with the snippets,
ranking the snippets based on the scores,
selecting, based on the ranking, a subset of the snippets for inclusion in the summary, and
outputting the selected subset of the snippets.

2. The method of claim 1, further comprising:
receiving a query comprising a search term;
generating, based on the aggregated data, search results that match the search term and relevance scores for the search results;
generating a ranking of the search results based on the relevance scores; and
outputting, based on a ranking, at least a portion of the search results in a response to the query.

3. The method of claim 2, wherein the search results are generated from indexes comprising the terms included in the recordings and locations of the terms in the recordings.

4. The method of claim 2, wherein the relevance scores are generated based on at least one of a term frequency-inverse document frequency (tf-idf) and threads associated with the set of search results.

5. The method of claim 2, wherein the search results comprise at least one of a snippet of a recording, a transcript of the snippet, and a highlight in a meeting.

6. The method of claim 1, wherein the insights comprise at least one of an inquisitiveness, a quantitativeness, a sentiment, a topic, a theme, and an entity.

7. The method of claim 1, wherein generating the thread comprising the collection of related meetings that share the one or more attributes comprises:
detecting topics found in the set of available meetings; and
generating the collection of related meetings to share one or more of the topics.

8. The method of claim 1, wherein generating the thread comprising the collection of related meetings that share the one or more attributes comprises:
identifying a group of related users; and
generating the collection of related meetings to share the group of related users as attendees.

9. The method of claim 1, wherein generating the thread comprising the collection of related meetings that share the one or more attributes comprises obtaining the one or more attributes from a user.

10. The method of claim 1, wherein the metadata comprises at least one of a title, a location, a description, an agenda, a time, a duration, a list of participants, an inviter, an organizer, a domain name, a tag, and a label.

11. A non-transitory computer readable media storing instructions that, when executed by one or more processors, cause the one or more processors to perform the steps of:
generating, from a set of available meetings, a thread comprising a collection of related meetings that share one or more attributes;
aggregating data for the related meetings, wherein the data comprises metadata for the related meetings and terms included in recordings of the related meetings, wherein aggregating the data for the related meetings under the collection further comprises merging adjacent snippets in a recording when a temporal separation between the adjacent snippets falls below a threshold;
analyzing the aggregated data for insights associated with the related meetings; and
outputting at least a portion of the aggregated data within a summary of the thread, wherein outputting the at least a portion of the aggregated data within the summary of the thread comprises:

generating scores for snippets of voice activity in the recordings based on content of the snippets and contexts associated with the snippets, ranking the snippets based on the scores, selecting, based on the ranking, a subset of the snippets for inclusion in the summary, and outputting the selected subset of the snippets.

12. The non-transitory computer readable media of claim 11, wherein the steps further comprise:

receiving a query comprising a search term;

generating, based on the aggregated data, search results that match the search term and relevance scores for the search results;

generating, based on the relevance scores, a ranking of the search results; and outputting at least a portion of the ranking in a response to the query.

13. The non-transitory computer readable media of claim 12, wherein the relevance scores are generated based on at least one of a term frequency-inverse document frequency (tf-idf) and threads associated with the set of search results.

14. The non-transitory computer readable media of claim 11, wherein generating the thread comprising the collection of related meetings that share the one or more attributes comprises:

detecting topics found in the set of available meetings; and generating the collection of related meetings to share one or more of the topics.

15. The non-transitory computer readable media of claim 11, wherein generating the thread comprising the collection of related meetings that share the one or more attributes comprises:

identifying a group of related users; and generating the collection of related meetings to share the group of related users as attendees.

16. A system, comprising:

a memory device, and a processor coupled to the memory, wherein the processor is configured to:

generate, from a set of available meetings, a thread comprising a collection of related meetings that share one or more attributes;

aggregate data for the related meetings, wherein the data comprises metadata for the related meetings and terms included in recordings of the related meetings, wherein the processor being configured to aggregate the data for the related meetings under the collection further comprises the processor being configured to merge adjacent snippets in a recording when a temporal separation between the adjacent snippets falls below a threshold;

analyze the aggregated data for insights associated with the related meetings; and output at least a portion of the aggregated data within a summary of the thread, wherein the processor being operative to output the at least a portion of the aggregated data within the summary of the thread comprises the processor being operative to:

generate scores for snippets of voice activity in the recordings based on content of the snippets and contexts associated with the snippets, rank the snippets based on the scores, and select, based on the ranking, a subset of the snippets for inclusion in the summary, and output the selected subset of the snippets.

17. The system of claim 16, wherein the processor being operative to generate the thread comprising the collection of related meetings that share the one or more attributes comprises the processor being operative to:

detect topics found in the set of available meetings; and generate the collection of related meetings to share one or more of the topics.

18. The system of claim 16, wherein the processor being operative to generate the thread comprising the collection of related meetings that share the one or more attributes comprises the processor being operative to:

identify a group of related users; and generate the collection of related meetings to share the group of related users as attendees.

* * * * *